(12) United States Patent
Merritt et al.

(10) Patent No.: US 6,742,834 B1
(45) Date of Patent: Jun. 1, 2004

(54) MIDGATE ASSEMBLY INCLUDING GARAGE DOOR STYLE MIDGATE PANEL

(75) Inventors: Elizabeth A. Merritt, Bloomfield Hills, MI (US); Andrew J. Novajovsky, Grand Blanc, MI (US); Vincent L. Ruma, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/443,319

(22) Filed: May 22, 2003

(51) Int. Cl.$^7$ .................................................. B60J 7/00
(52) U.S. Cl. .............................. 296/190.11; 296/146.2; 296/50; 296/146.8; 296/26.11
(58) Field of Search ................... 296/190.11, 190.1, 296/190.08, 190.04, 146.1, 26.11, 37.16, 37.6, 37.5, 24.1, 183, 203.04, 146.8, 63, 64, 100.06, 146.2

(56) References Cited

U.S. PATENT DOCUMENTS

| 4,480,868 | A | * | 11/1984 | Koto ..................... 296/190.11 |
| 4,671,013 | A | * | 6/1987 | Friese et al. .............. 296/146.2 |
| 5,427,425 | A | * | 6/1995 | Droesch ....................... 296/50 |
| 5,501,503 | A | * | 3/1996 | Thayer ..................... 296/146.8 |
| 5,934,727 | A | * | 8/1999 | Storc et al. .............. 296/26.11 |
| 6,260,916 | B1 | * | 7/2001 | Hunt ..................... 296/190.11 |
| 6,398,291 | B1 | * | 6/2002 | Reusswig et al. ....... 296/190.11 |
| 6,416,104 | B1 | * | 7/2002 | Fisher et al. ........... 296/190.11 |
| 6,419,299 | B1 | * | 7/2002 | Pyo ........................ 296/190.11 |
| 6,422,638 | B1 | * | 7/2002 | Carnaghi et al. ........ 296/190.1 |
| 6,450,566 | B1 | * | 9/2002 | Hong ..................... 296/190.11 |
| 6,478,355 | B1 | * | 11/2002 | Van Eden et al. ....... 296/146.2 |
| 6,494,519 | B2 | * | 12/2002 | Sturgin et al. ........... 296/146.8 |
| 6,513,863 | B1 | * | 2/2003 | Renke et al. .......... 296/190.11 |
| 6,520,562 | B2 | * | 2/2003 | Pyo ........................ 296/190.11 |
| 6,550,849 | B1 | * | 4/2003 | Dosdall ................. 296/190.11 |
| 6,619,723 | B2 | * | 9/2003 | Duffy .................... 296/190.11 |
| 2002/0070573 | A1 | * | 6/2002 | Song ........................ 296/26.11 |

* cited by examiner

*Primary Examiner*—Kiran Patel
(74) *Attorney, Agent, or Firm*—Laura C. Hargitt

(57) ABSTRACT

A vehicle body includes a passenger compartment and a cargo compartment separated by a midgate assembly which occupies a midgate opening. A seat is positioned in the passenger compartment. The midgate assembly includes a midgate panel which is movable along a pair of guide tracks from a closed position in the midgate opening to an open position under the seat.

11 Claims, 4 Drawing Sheets

MIDGATE ASSEMBLY INCLUDING GARAGE DOOR STYLE MIDGATE PANEL

TECHNICAL FIELD

The present invention relates to a midgate assembly including a garage door style midgate panel which is movable between a closed position in a midgate opening and an open position beneath a vehicle seat.

BACKGROUND OF THE INVENTION

It is known in the art to provide a pickup truck or SUV having a cab portion for carrying passengers in a rear seat section behind the driver and a cargo box behind the cab portion for carrying cargo. It is also known to provide aligned openings in the cab portion and the cargo box for carrying longer loads which extend into the passenger compartment with the rear seat folded down. Currently, a multi-use vehicle is available which provides a pickup truck having a rear passenger compartment convertible to a cargo area and separated from a rear pickup box by a midgate having a panel and a window. This vehicle is adapted to accommodate a variety of optional configurations for alternatively carrying a maximum passenger load or an extended cargo load under both covered and uncovered conditions where the cargo load is protected from or exposed to ambient external conditions.

It is desirable to provide a midgate panel which may be conveniently stored in unused space in the vehicle when the midgate panel is not occupying the midgate opening.

SUMMARY OF THE INVENTION

The invention provides a midgate assembly including a garage door style midgate panel which is slidable along the guide tracks to a position underneath a seat.

More specifically, the invention provides a vehicle body having a first compartment for carrying passengers or cargo and a second compartment for carrying cargo rearwardly adjacent the first compartment. The body includes a frame defining an opening between the first and second compartments. The opening includes lower and upper portions. First and second guide tracks each include a first portion secured to the frame along opposing sides of the lower portion of the opening, a curved portion adjacent bottom corners of the lower portion of the opening, and a second portion extending forwardly in the vehicle body from the respective curved portion. A midgate panel has opposing sides slidably engaged with the first and second guide tracks to facilitate movement of the panel from a closed position covering the lower portion of the opening when the panel engages the first portion of the guide tracks, to an open position permitting access through the lower portion of the opening when the panel engages the second portion of the guide tracks.

Preferably, the midgate panel is a garage door style midgate panel including a plurality of sections hinged together along a plurality of horizontal splits in the midgate panel. The panel also includes a plurality of rollers for rolling engagement with the first and second tracks.

A window is mounted in the frame to close the upper portion of the opening. The window may be removably mounted in the frame to selectively permit access through the upper portion of the opening. Alternatively, the window may be hinged to the frame for pivotable movement to an open position. The window may be hinged along an upper edge to facilitate pivotal movement upward against a roof of the body. The glass could pivot forward or rearward. A crossbar may be mounted in the opening between the upper and lower portions. The window could be glued in place with a fixed crossbar.

A seat may be positioned in the first compartment, and the second portion of each guide track may extend beneath the seat such that the midgate panel is positioned under the seat when in the open position.

A drive motor may be operatively connected to the midgate panel to actuate movement of the midgate panel between the open and closed positions.

The seat may include a collapsible seatback which may be used to selectively increase cargo storage capacity in the first compartment.

These and other features and advantages of the present invention will be more further understood from the following description of the specific embodiments of the invention taken together with the accompanying drawings.

DESCRIPTION OF THE PREFERRED EMBODIMENTS

Figure 1:
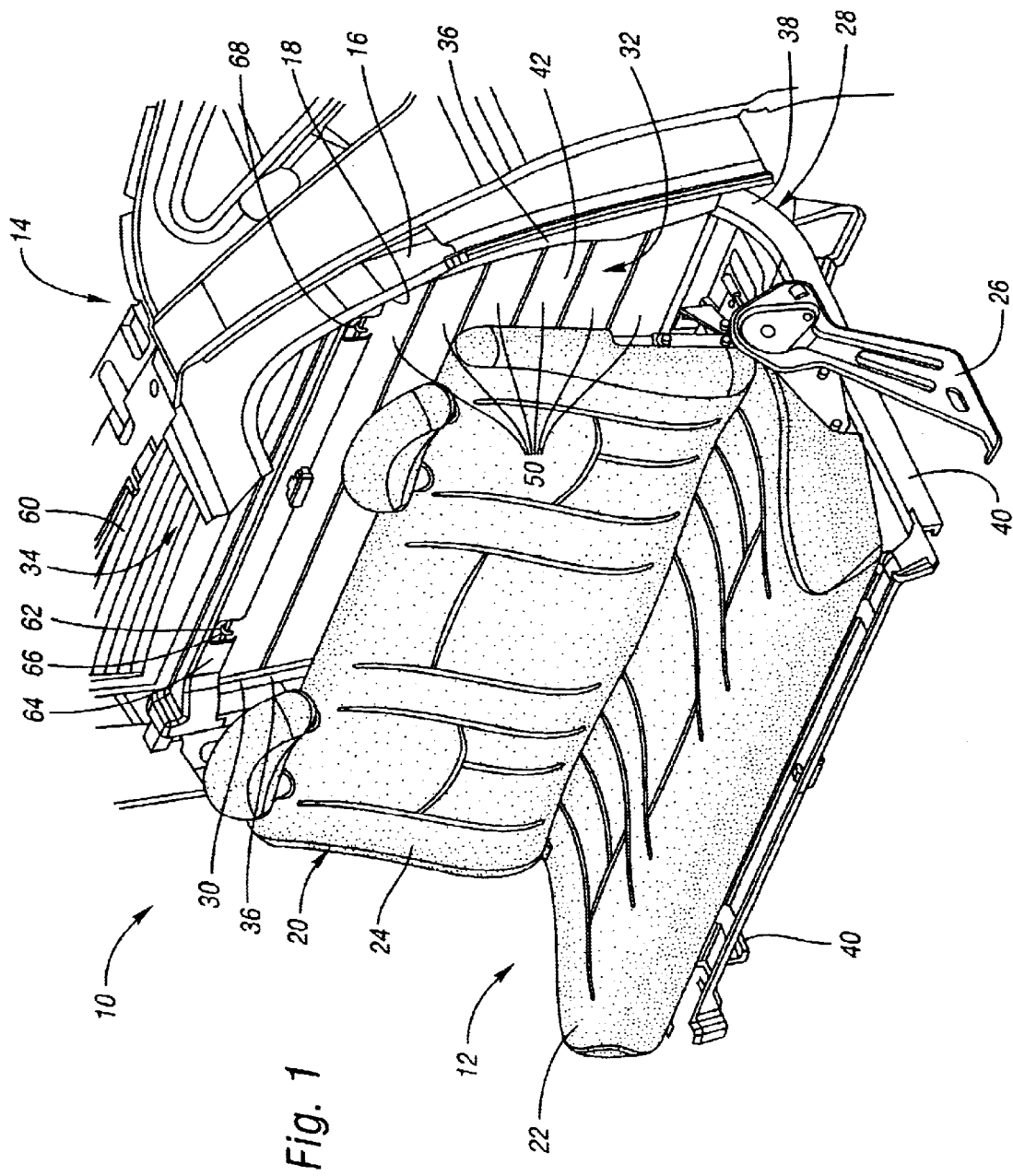
FIG. 1 shows a partial front perspective view of a vehicle body in accordance with present invention with the midgate panel in the closed position.
Figure 2:
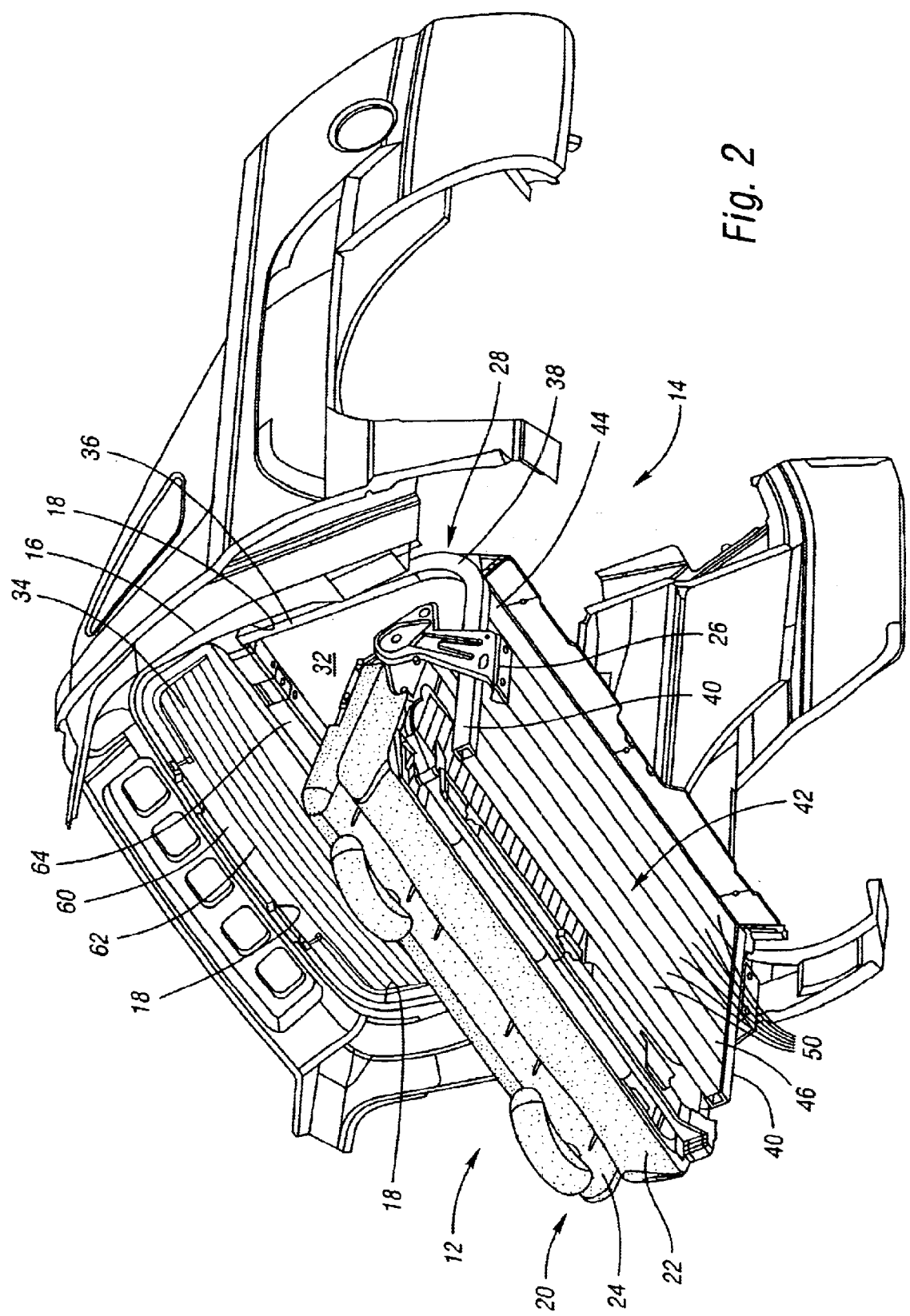
FIG. 2 shows a partial underside perspective view of the vehicle body of FIG. 1 with the midgate panel in the open position.

Referring to FIGS. 1 and 2, a vehicle body 10 is partially illustrated. The vehicle body 10 includes a first compartment 12 for carrying passengers or cargo, and a second compartment or cargo box 14 for carrying cargo rearwardly adjacent the first compartment 12. The body includes a frame 16 which defines an opening 18 between the first and second compartments 12, 14.

Figure 4:
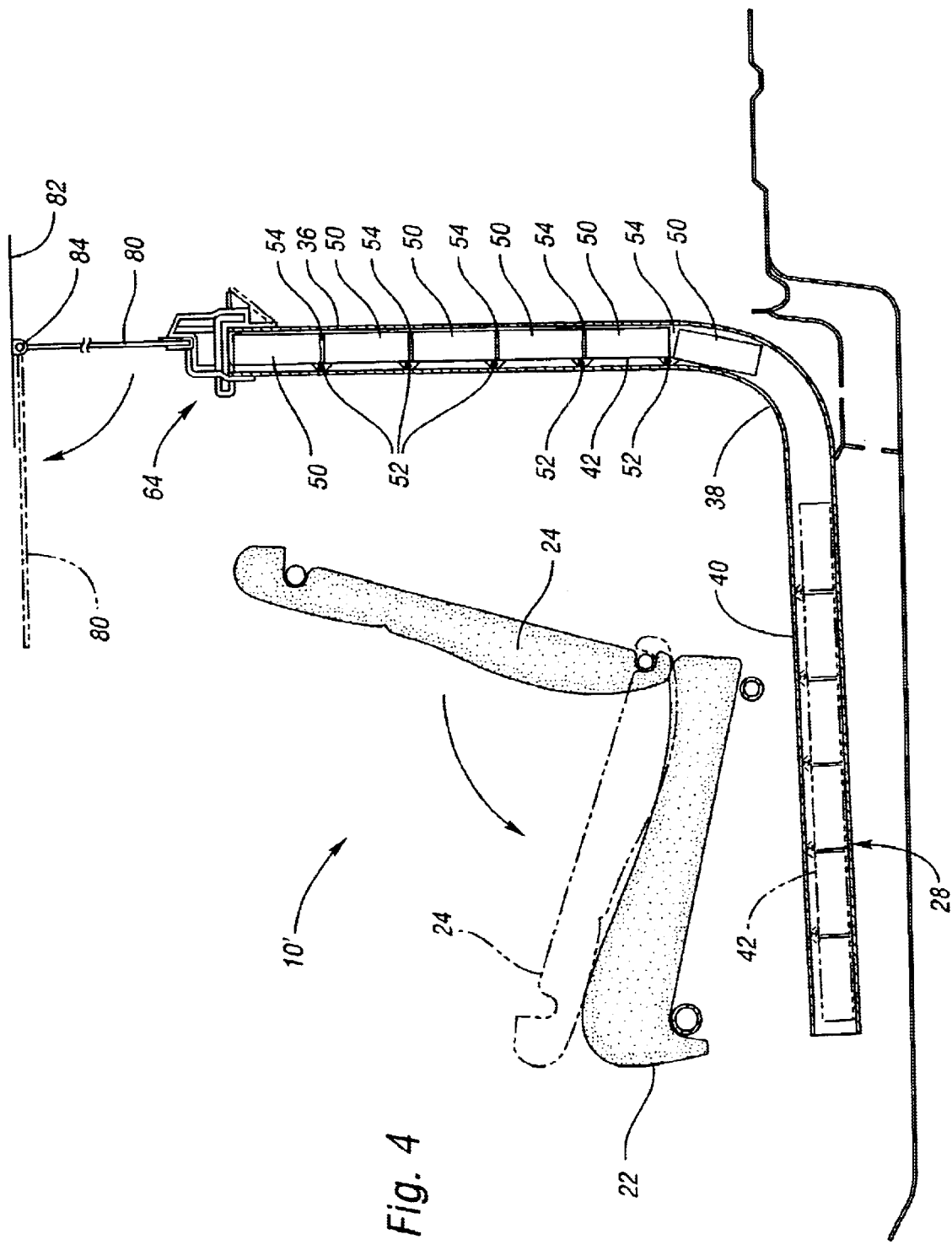
FIG. 4 shows a schematic vertical cross sectional side view of a body in accordance with an alternative embodiment of the invention.

A seat assembly 20 is positioned in the first compartment 12, and includes a lower seat 22 and a collapsible seatback 24. The seat assembly 20 is supported by stanchions 26. The seatback 24 is collapsible onto the lower seat 22 as shown in FIGS. 2 and 4.

First and second guide tracks 28, 30 are secured to the opening 18 of frame 16 as shown in FIGS. 1 and 2. The opening 18 includes lower and upper portions 32, 34.

The first and second guide tracks 28, 30 each include a first portion 36 secured to the frame 16 along opposing sides of the lower portion 32 of the opening 18, a curved portion 38 adjacent bottom corners of the lower portion 32 of the opening 18, and a second portion 40 extending forwardly in the vehicle body from the curved portion 38. As shown, the second portions 40 of the first and second guide tracks 28, 30 extend underneath the seat assembly 20. Both the first and second guide tracks 28, 30 are not entirely visible in all of the Figures, but one can appreciate that the guide tracks 28, 30 are mirror images of each other.

The garage door style midgate panel 42 includes opposing sides 44, 46 which are slidably engaged with the first and second guide tracks 28, 30, respectively, to facilitate movement of the midgate panel 42 between the closed position covering the lower portion 32 of the opening 18 when the midgate panel 42 engages the first portion 36 of the guide tracks 28, 30 as shown in FIG. 1, and an open position permitting access through the lower portion 32 of opening 18 when the midgate panel 42 engages the second portion 40 of the guide tracks 28, 30, as shown in FIG. 2.

The midgate panel 42 includes a plurality of sections 50 which are hinged together by hinges 52, as shown in FIG. 4. The plurality of sections 50 are hinged together along the horizontal splits 54, as shown in FIG. 4.

Figure 3:
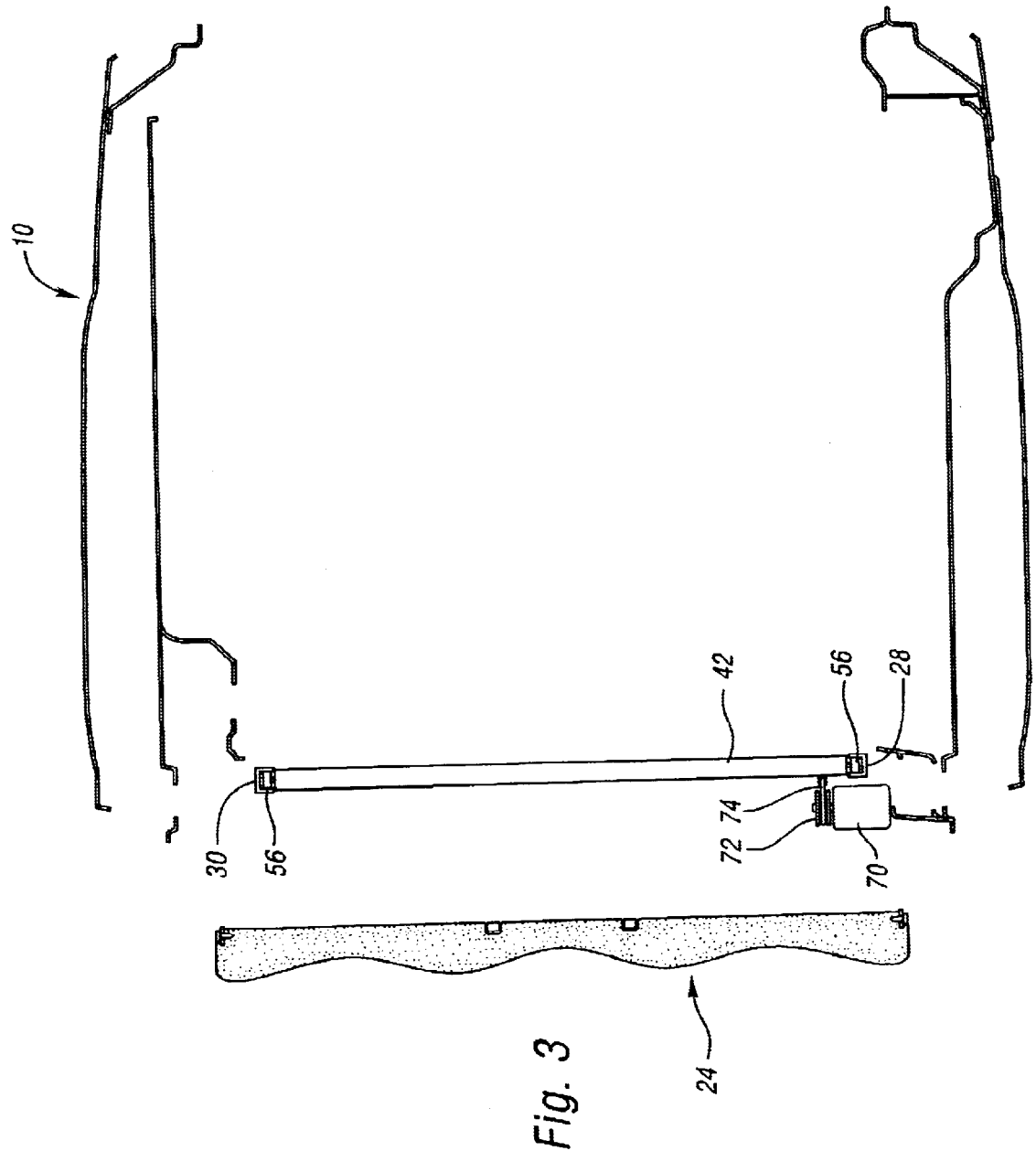
FIG. 3 shows a horizontal cross sectional view taken through the body of FIG. 1.

As shown in FIG. 3, the midgate panel 42 includes a plurality of rollers 56 along the opposing sides 44, 46 of the midgate panel 42 for rolling engagement with the first and second guide tracks 28, 30. At least one such roller is provided at each end of each of the plurality of sections 50.

As shown in FIGS. 1 and 2, a window 60 is mounted in the opening 18 to close the upper portion 34 of the opening 18. The window 60 is illustrated in FIGS. 1 and 2 to include defroster frits 62. The window 60 is supported by a crossbar 64. The crossbar 64 includes latch/striker assemblies 66, 68 which hold the midgate panel 42 in the upright, closed position, shown in FIG. 1.

The window 60 may be removably mounted in the upper portion 34 of the opening 18 to selectively permit access through the upper portion 34 of the opening 18. Alternatively, the window could be glued in place with a fixed crossbar.

The "midgate assembly" includes the midgate panel 42, first and second guide tracks 28, 30, the crossbar 64 and the window 60.

As shown schematically in FIG. 3, a drive motor 70 may be operatively connected to the midgate panel 42 to actuate movement of the midgate panel between the open and closed positions. The drive motor 70 rotates a pulley 72 which actuates a cable 74 connected to the midgate panel 42 to cause midgate panel movement.

FIG. 4 shows a slightly modified alternative body 10' in accordance with the invention, wherein like reference numerals are used to refer to like components from FIGS. 1–3. This embodiments differs from the embodiment of FIGS. 1–3 in that the window 80 is hinged to a vehicle roof 82 along an upper edge of the window 80 by hinges 84. As shown, the window 80 is pivotable toward the roof 82 to a horizontal position (shown in phantom) in which the window 80 may be received within a recess formed in a headliner of the roof 82.

FIG. 4 also illustrates the closed and open positions of the midgate panel 42 with respect to the track 28. The midgate panel 42 is shown in the closed position in FIG. 4, with the open position shown in phantom. Each of the sections 50 includes at least one roller at each end, such as the rollers 56 shown in FIG. 3, to facilitate the sliding movement of the midgate panel 42 along the track 28.

Supporting disclosure may also be found in commonly owned U.S. Pat. Nos. 5,934,727; 6,260,916; 6,416,104; 6,478,355 and 6,513,863, which are hereby incorporated by reference in their entirety.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A vehicle body having a first compartment for carrying passengers or cargo and a second compartment for carrying cargo rearwardly adjacent to the first compartment, the body comprising:

a frame defining an opening between the first and second compartments, the opening including lower and upper portions; first and second guide tracks each having a first portion secured to the frame along opposing sides of the lower portion of the opening, a curved portion adjacent bottom corners of the lower portion of the opening, and a second portion extending forwardly in the vehicle body from the respective curved portion; and a midgate panel having opposing sides slidably engaged with the first and second guide tracks to facilitate movement of the panel between a closed position covering the lower portion of the opening when the panel engages the first portion of the guide tracks, and an open position permitting access through the lower portion of the opening when the panel engages the second portion of the guide tracks.

2. The vehicle body of claim 1, wherein said midgate panel is comprised of a plurality of sections hinged together along a plurality of horizontal splits in said midgate panel.

3. The vehicle body of claim 2, wherein said midgate panel further includes a plurality of rollers for rolling engagement with said first and second guide tracks.

4. The vehicle body of claim 1, further comprising a window mounted in the frame to close the upper portion of the opening.

5. The vehicle body of claim 4, wherein said window is removably mounted in the frame to selectively permit access through the upper portion of the opening.

6. The vehicle body of claim 4, wherein said window is hinged to the frame for pivotal movement to an open position.

7. The vehicle body of claim 1, further comprising a crossbar mounted in the opening between the upper and lower portions.

8. The vehicle body of claim 1, further comprising a seat positioned in the first compartment, wherein said second portion of each guide track extends beneath the seat such that the midgate panel is positioned under the seat in said open position.

9. The vehicle body of claim 1, further comprising a drive motor operatively connected to the midgate panel to actuate movement of the midgate panel between the open and closed positions.

10. The vehicle body of claim 6, wherein said window is hinged along an upper edge for pivotal movement toward a roof of the body.

11. The vehicle body of claim 8, wherein said seat includes a seatback which is collapsible to increase cargo storage capacity in the first compartment.

* * * * *